(12) United States Patent
Wolfel et al.

(10) Patent No.: US 11,993,354 B2
(45) Date of Patent: May 28, 2024

(54) FUEL CELL CHARGING SYSTEM WITH AIR BREATHING CAPABILITY, AUTONOMOUS UNDERWATER VEHICLE (AUV) SYSTEM INCLUDING SAME, AND METHOD OF USE

(71) Applicant: Terradepth, Inc., Austin, TX (US)

(72) Inventors: Josef Wolfel, Austin, TX (US); Judson A. Kauffman, Austin, TX (US); Andrew Resnick, Austin, TX (US); Kenneth L. Childress, Camano Island, WA (US); David L. Pearson, Austin, TX (US)

(73) Assignee: Terradepth, Inc., Austin, TX (US)

( * ) Notice: Subject to any disclaimer, the term of this patent is extended or adjusted under 35 U.S.C. 154(b) by 484 days.

(21) Appl. No.: 17/202,942

(22) Filed: Mar. 16, 2021

(65) Prior Publication Data

US 2021/0284304 A1   Sep. 16, 2021

Related U.S. Application Data

(60) Provisional application No. 62/990,158, filed on Mar. 16, 2020.

(51) Int. Cl.
*B63G 8/00* (2006.01)
*B60L 53/126* (2019.01)
(Continued)

(52) U.S. Cl.
CPC ............ *B63G 8/001* (2013.01); *B60L 53/126* (2019.02); *B60L 53/305* (2019.02); *B60L 53/65* (2019.02);
(Continued)

(58) Field of Classification Search
CPC .......... B63G 8/00; B63G 8/001; B60L 53/65; B60L 53/66; B60L 53/126; B60L 53/305; H01M 8/04201
(Continued)

(56) References Cited

U.S. PATENT DOCUMENTS 3,795,544 A    3/1974   Clausi et al.
5,141,823 A    8/1992   Wright et al.
(Continued)

FOREIGN PATENT DOCUMENTS

CN        109539226         3/2019
DE    102017107577 A1       4/2017
(Continued)

OTHER PUBLICATIONS

PCT Search Report, PCT/US2021/022510, dated Jul. 14, 2021, 15 pgs.
(Continued)

*Primary Examiner* — Lars A Olson
(74) *Attorney, Agent, or Firm* — Dicke, Billig & Czaja, PLLC

(57) ABSTRACT

An autonomous underwater vehicle (AUV) may include a fuel cell charging system including a power generation subsystem having an air breathing subsystem taking intake air from the external atmosphere, a supply of compressed hydrogen in onboard storage tanks, an air-breathing PEMFC receiving the intake air and hydrogen, the PEMFC operable to produce electric energy and generating waste water, a water removal system for discharging the waste water offboard, and the fuel cell charging system having a power storage subsystem including a chargeable battery subsystem to receive electric energy to charge the chargeable battery subsystem. A system manager of an onboard data processing system may be configured to control the fuel cell charging system.

21 Claims, 6 Drawing Sheets

(51) Int. Cl.
  B60L 53/30 (2019.01)
  B60L 53/65 (2019.01)
  B60L 53/66 (2019.01)
  H01M 8/04 (2016.01)
  H01M 8/04082 (2016.01)
(52) U.S. Cl.
  CPC ......... B60L 53/66 (2019.02); H01M 8/04201 (2013.01); *B63G 2008/004* (2013.01)
(58) Field of Classification Search
  USPC ........................................................ 114/313
  See application file for complete search history.

(56) References Cited

U.S. PATENT DOCUMENTS

| | | | |
|---|---|---|---|
| 5,401,589 | A | 3/1995 | Palmer et al. |
| 6,063,515 | A | 5/2000 | Epp et al. |
| 6,911,274 | B1 | 6/2005 | Colborn et al. |
| 7,183,742 | B2 | 2/2007 | Potter et al. |
| 7,635,531 | B1 | 12/2009 | Carreiro et al. |
| 7,938,077 | B1 | 5/2011 | Dunn et al. |
| 8,497,043 | B2 | 7/2013 | Cleland |
| 8,814,616 | B2 | 8/2014 | Riggs |
| 8,932,769 | B2 | 1/2015 | Ohashi |
| 9,452,814 | B2 * | 9/2016 | Cantwell .................. B63G 8/12 |
| 9,786,943 | B2 | 10/2017 | Patolsky et al. |
| 10,067,507 | B2 | 9/2018 | Davoodi et al. |
| 2005/0261844 | A1 | 11/2005 | Iwers |
| 2008/0305378 | A1 | 12/2008 | Spink et al. |
| 2010/0055517 | A1 | 3/2010 | Uzhinsky et al. |
| 2012/0094202 | A1 | 4/2012 | Rethore |
| 2014/0234737 | A1 | 8/2014 | Arlt |
| 2015/0251741 | A1 | 9/2015 | Cantwell et al. |
| 2018/0162502 | A1 | 6/2018 | McClure et al. |

FOREIGN PATENT DOCUMENTS

| | | |
|---|---|---|
| FR | 2659290 | 3/1990 |
| FR | 2768393 | 9/1997 |
| GB | 2543764 | 10/2015 |
| WO | WO 2019/222809 A1 | 11/2019 |

OTHER PUBLICATIONS

Stuart Jones, "A Brief Introduction to Fuel Cells," ABSL Power Solutions Ltd., pp. 11 (Aug. 2008).

Chevrolet, Victor Chen and Bob Freeman, "GM and U.S. Navy Collaborating on Fuel Cell-Powered Underwater Unmanned Vehicles; Hydrogen Fuel Cell Technology Could Augment Ships and Subs on Patrol," General Motors, The Office of Naval Research and the U.S. Naval Research Laboratory, pp. 2 (Jun. 23, 2016). <https://pressroom.gm.com/gmbx/us/en/pressroom/home/news.detail.html/Pages/news/us/en2016/jun/0623-gm-us-navy.html>.

Q. Cai et al., "Hybrid Fuel Cell/Battery Power Systems for Underwater Vehicles," 3rd SEAS DTC Technical Conference—Edinburgh, pp. 9 (2007).

Cellula Robotics Ltd., "Solus-LR Autonomous Underwater Vehicle," Cellula.com, pp. 2 (Retrieved Jan. 9, 2023).

* cited by examiner

FUEL CELL CHARGING SYSTEM WITH AIR BREATHING CAPABILITY, AUTONOMOUS UNDERWATER VEHICLE (AUV) SYSTEM INCLUDING SAME, AND METHOD OF USE

REFERENCE TO RELATED APPLICATIONS

This application is related and claims priority to U.S. Provisional Application No. 62/990,158 filed Mar. 16, 2020 and titled FUEL CELL CHARGING SYSTEM WITH AIR BREATHING CAPABILITY, AUTONOMOUS UNDERWATER VEHICLE (AUV) SYSTEM INCLUDING SAME, AND METHOD OF USE, which is incorporated by reference in entirety.

FIELD OF THE INVENTION

The present disclosure relates to autonomous underwater vehicle systems, particularly to fuel cell power systems for autonomous underwater vehicle systems, and to methods of using the aforementioned.

BACKGROUND OF THE INVENTION

Unmanned Underwater Vehicles (UUV's), also known as Autonomous Underwater Vehicles (AUV's) (collectively, Autonomous Underwater Vehicles (AUV's) were first developed in 1957 and have been in operational existence since the mid-1970's. Restraints on the amount of power stored by available battery systems have limited the type of tasks for which AUV's may be used. As battery systems have improved, power supplies have improved, power requirements have changed, and the endurance of AUV's has improved. This improved endurance has presented new opportunities for additional applications using AUV's. Even with existing technological advances AUV's are still limited to, at best, a few days of operation in applications with low power demand. AUV's are limited to only hours of operation in applications having high power demand. Such high power demand applications may include, for example, deployment of sonar systems. When power stores are depleted, the AUV may be brought to the surface and re-charged, or re-fitted with new batteries.

Whereas counterpart Autonomous Surface Vehicles (ASV's) operating at the ocean surface can take advantage of alternative and/or environmentally available power sources such as wind, solar and wave energy, the deployment of sources other than battery systems, such as diesel or compressed Hydrogen/Oxygen fuel cells, has been very limited, and typically is available only on large displacement AUV systems. Such large displacement AUV systems are cost prohibitive for many applications. Various governments have paid some attention to fuel cells using compressed Hydrogen and Oxygen stored in tanks. Storage tanks of compressed Hydrogen and Oxygen has been successfully installed in AUV prototypes. Where storage tanks of compressed Hydrogen and Oxygen have been installed, the range and endurance of AUV's has been increased. Other oxygen sources such as metal hydride, ammonia, and sodium borohydride have been considered as potential oxidizers for fuel cells in AUVs, but suffer with notable drawbacks.

BRIEF DESCRIPTION OF THE INVENTION

The above-mentioned shortcomings, disadvantages and problems are addressed herein, as may be understood by those skilled in the art upon reading and studying the following specification. This Brief Description is provided to introduce a selection of concepts in a simplified form that are further described below in more detail in the Detailed Description. This Brief Description is not intended to identify key or essential features of the claimed subject matter. Unless otherwise defined, all terms (including technical and scientific terms) used herein have the same meaning as commonly understood by one of ordinary skill in the art to which this disclosure belongs. It may be further understood that terms, such as those defined in commonly used dictionaries, should be interpreted as having a meaning that is consistent with their meaning in the context of the relevant art and the present disclosure, and may not be interpreted in an idealized or overly formal sense unless expressly so defined herein.

In embodiments, an AUV system (or "AUV") may include a fuel cell power system that allows the AUV to remain deployed at sea without human intervention for weeks or months. An AUV system having a fuel cell power system as herein disclosed may have an advantageous operational range than other AUV systems lacking such a fuel cell power system as disclosed. An AUV having a fuel cell power system, as herein disclosed, may have greater power capacity than other AUV's, and thus may be used to deploy and power high end payloads, such as hydrographic and bathymetric payloads having high power demand, without being recovered for re-charging or battery replacement as frequently as other AUV's which lack a fuel cell power system as herein disclosed.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages may become apparent by reference to the associated drawings, detailed description, and claims.

BRIEF DESCRIPTION OF THE DRAWINGS

The disclosed subject matter itself, as well as further objectives, and advantages thereof, may best be illustrated by reference to the following detailed description of embodiments of the device read in conjunction with the accompanying drawings, wherein.

DETAILED DESCRIPTION OF THE INVENTION

Figure 1:
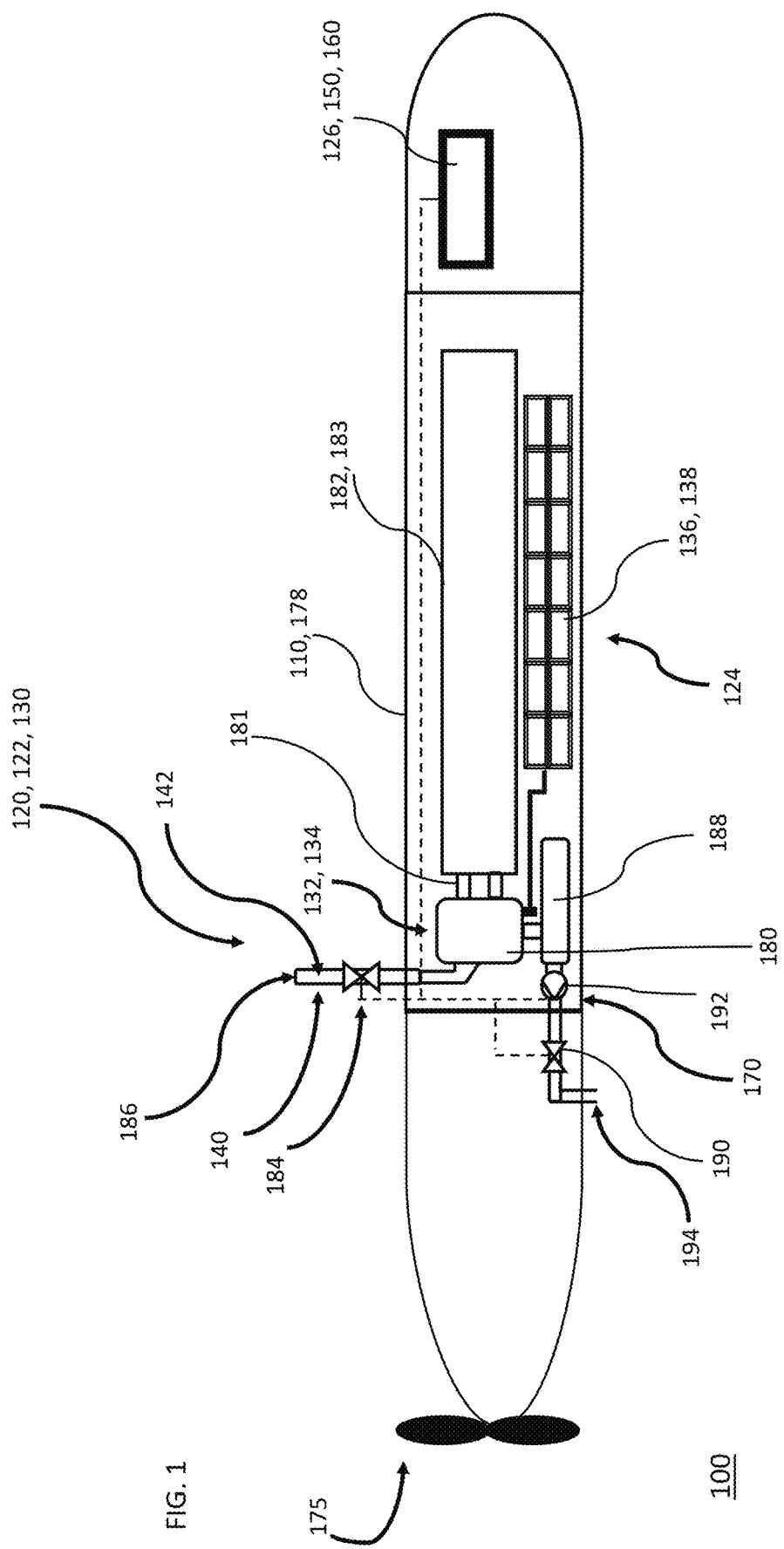
FIG. 1 is a simplified schematic diagram illustrating an autonomous underwater vehicle (AUV) including a fuel cell charging system with air breathing capability, in an embodiment.

In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It may be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It may be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it may be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein. The detailed description set forth herein in connection with the appended drawings is intended as a description of exemplary embodiments in which the presently disclosed apparatus and system maybe practiced. The term "exemplary" used throughout this description means "serving as an example, instance, or illustration," and should not necessarily be construed as preferred or advantageous over other embodiments.

FIG. 1 is a simplified schematic diagram illustrating an autonomous underwater vehicle (AUV) system 100 (or, in the alternative "AUV 100" or "system 100"). In an embodiment, the AUV 100 may be particularly an autonomous underwater/surface vehicle (AUSV) capable of operation both at the ocean surface and submerged at depth. Hereinafter, the term "AUV" will include AUSV's and any other AUV variations.

Referring to FIG. 1, AUV 100 may include a power supply system 120 in an embodiment. Power supply system 120 may include a fuel cell charging system 130 with air breathing subsystem 140, in an embodiment. The AUV 100 may operate in an ocean environment. For purposes of this detailed description, the ocean environment may be characterized or described as having an ocean surface environment region, an undersea environment region remote from the ocean surface and which may extend to the seabed. In an embodiment as shown, for example, the AUV 100 may be configured to perform autonomous marine surveying of the ocean environment including the water column and seabed in a survey location. The AUV 100 may be configured for communication with other of the AUV's (not shown) and with remote units, such as remote servers or transceivers, over wireless communications systems (not shown). The AUV 100 may be configured to operate in a cooperative manner with other AUV's in a pair or group, interchangeably in the water in the ocean surface region, semi-submerged with a mast extending above water (not shown) with the vessel hull remaining submerged beneath the ocean surface per se, and when fully submerged in an undersea region remote from the ocean surface region. In an embodiment, the AUV 100 may be an AUSV capable of autonomous operation on the ocean surface and when fully submerged.

As shown in FIG. 1, in an embodiment, the AUV 100 may include an onboard computing system 150 including a processor and memory accessible to the processor. AUV 100 may include a wireless communication interface operable in relation to the processor to perform and provide two-way wireless communications links according to respective suitable communications types and protocols. In an embodiment, the wireless communication interface may be configured for data communication with an offboard remote server (not shown). In embodiments, for example, the remote server may be located at an onshore facility or remote command vessel, which may be manned. The communications protocol, for example, may be, a network communications protocol such as Internet Protocol (IP) or other suitable packetized data communication protocol. The onboard computing system 150 thus may be configured for data communications via the wireless communication interface with the remote server. In an embodiment, the remote server may be configured for monitoring the onboard computing system 150. The remote server may receive status data from, and send commands to, the AUV 100 when located in the ocean surface environment and functioning in a surface vehicle role.

AUV 100 may include a plurality of modules each including instructions executable by the processor of the onboard computing system 150. It may be understood that each module, whether whole or in part, may be embodied in software, hardware, or both. More particularly, as shown in FIG. 1, AUV 100 may include a system manager module 160 including instructions executable by the processor. In an embodiment, the system manager module 160 may include instructions of a system manager algorithm, executable by the processor of the onboard computing system 150. System manager module 160 may be configured to manage operations of AUV 100. The system manager module 160, in an embodiment, may be configured to control, for example, any of the following: power system 120, water pumping system 170, and a communications system including the wireless communications interface.

Referring to FIG. 1, the AUV 100 may include a submarine hull structure 110. Hull structure 110 may be configured to house all operating unit infrastructure. The operating unit infrastructure may omit tanks for storing compressed gaseous oxidizing agent, such as compressed oxygen. Hull structure 110 may have a form factor and hull volume defined to contain the operating unit infrastructure. The form factor and hull volume of hull structure 110 as herein disclosed may be advantageous in comparison to a different hull structure that must house tanks for storing a compressed gaseous oxidizing agent. In an embodiment, the hull structure 110 may be a hybrid design of an AUSV, which is configured for both submerged operation in the undersea environment and surface operation at the ocean surface.

Referring to FIG. 1, the AUV 100 may include a maneuvering system.

Maneuvering system may include a propulsion system, steering system, and ballast subsystem. The propulsion system may include an electric motor (not shown) connected to the power system 120 to receive electric energy therefrom. The electric motor may drive rotation of a propeller 175. The ballast subsystem may include a plurality of ballast tanks housed within hull structure 110. The ballast tanks may be in controlled fluid communication with water in the ocean environment to be filled with such water to serve as ballast, and to enable such water ballast to be evacuated therefrom, and also may be in controlled fluid communication with a supply of air for selectively filling the ballast tanks therewith during surface operations. The volume of the ballast tanks of an AUV 100 as herein disclosed may be advantageous and smaller in comparison to a different AUV that must house tanks for storing a compressed gaseous oxidizing agent. The volume of ballast tanks of the AUV 100 may enable the AUV 100 to have a selected center of mass, which may differ from that of another AUV requiring larger ballast tanks.

Referring to FIG. 1, AUV 100 may include onboard power system 120 configured
to produce electric energy on-board, store on-board the electric energy thus produced, and deliver the electric energy to operating unit elements of the AUV 100 in electrical communication therewith, to power operation of such operating unit elements and thus operating the AUV 100. The onboard power system 120 may be capable of powering all operations of the AUV 100 on the ocean surface or when fully submerged, interchangeably.

Power system 120 may include a power generation subsystem 122 and a power storage subsystem 124 connected in electrical communication. Referring to FIG. 1, in an embodiment power system 120 may include power generation subsystem 122, which may include a fuel cell charging system 130. In an embodiment, fuel cell charging system 130 may include a fuel cell 132. In an embodiment, fuel cell 132 may be a hybrid, enclosed surface "air breathing" hydrogen fueled Proton-Exchange Membrane Fuel Cell (PEMFC) system 134. Power system 120 may include a plurality of bottles 182 of compressed hydrogen housed onboard the AUV 100 within the hull structure 110. Power system 120 may include an air intake snorkel 142 configured for selectable open communication with atmospheric air above the ocean surface when the AUV 100 is operating at the ocean surface, and selectable closure to prevent undesired intake of ocean water when the AUV 100 is submerged. The fuel cell charging system 130 may be capable of powering operation of AUV 100 on the ocean surface or fully submerged, interchangeably. Power system 120 having an air intake snorkel 142 thus may omit onboard storage of compressed gaseous oxidizing agent, such as oxygen.

Referring to FIG. 1, the power system 120 may be managed by system manager
module 160. When the AUV 100 is determined to be on the ocean surface, the system manager module 160 may activate the fuel cell charging system 130 to generate power by causing outside air to be drawn in through a snorkel 142 of an air breathing subsystem 140 and to be combined with pressurized hydrogen within the fuel cell 132, to produce and output electrical power from fuel cell 132. The system manager module 160 thus may control the power generation subsystem 122 including fuel cell 132 to produce power which may charge the chargeable battery subsystem 136.

Power system 120 may include power storage subsystem 124. As shown in FIG. 1, the power storage subsystem 124 may include a chargeable battery subsystem 136 in electrical communication with power generation subsystem 122. The chargeable battery subsystem 136, for example, may include an array including a plurality of: lithium ion batteries, lithium polymer batteries, or chargeable chemical structures having suitable energy density. In an embodiment, for example, the power storage subsystem 124 may include an array of chargeable storage batteries. In an embodiment, power storage subsystem 124 may include an array consisting of a plurality of rechargeable lithium ion batteries.

Power storage subsystem 124 may include battery management subsystem 126 configured to control power into and out of the chargeable battery subsystem 136. Battery management subsystem 126 may monitor the chargeable battery subsystem 136 during charging and discharging and manage same to maintain a predetermined charge level of the chargeable battery subsystem 136. In an embodiment, the fuel cell 132 may continue to operate and provide power while the AUV 100 is operating on the ocean surface and charge the chargeable battery subsystem 136, to maintain the charge level. In an embodiment, prior to the AUV 100 submerging from the ocean surface, the system manager module 160 may shut down the fuel cell 132 and cause the power system 120 to revert to only battery power from the chargeable battery subsystem 136 for submerged operations. The system manager module 160 may allow or manage the AUV 100 and power system 120 to operate when the AUV 100 is fully submerged, until the chargeable battery subsystem 136 is discharged to a predetermined minimum level of charge. The system manager module 160, when the chargeable battery subsystem 136 is discharged to the predetermined minimum level of charge, may cause the AUV 100 to return to the ocean surface. Upon the AUV 100 resurfacing, the system manager module 160 may activate the fuel cell 132, open the air intake snorkel 142 to take in outside air from above the ocean surface, and to be combined with hydrogen in the fuel cell 132, to output electric energy from the fuel cell 132. This cycle of the AUV 100 surfacing to charge the chargeable battery subsystem 136 and then submerging or diving to perform submerged, subsea operations powered by the chargeable battery subsystem 136, may be repeated as needed to perform operations for a desired period.

As shown in FIG. 1, the power storage subsystem 124 may include a chargeable battery subsystem 136 in electrical communication with power generation subsystem 122. The chargeable battery subsystem 136 may include a plurality of: a lithium ion battery, lithium polymer battery, or a chargeable chemical structure providing energy storage with suitable energy density. In an embodiment, for example, the power storage subsystem 124 may include an array of rechargeable storage batteries. In an embodiment, power storage subsystem 124 may include an array consisting of a plurality of rechargeable lithium ion batteries.

In each charging cycle, upon surfacing the system manager module 160 may again activate the fuel cell 132, open the air snorkel 142 allowing outside air for oxygen to be introduced to the fuel cell 132 to react with hydrogen from compressed hydrogen storage tanks carried onboard the AUV 100. The cycle of surface charging and submerged operations may be repeated until a mission is completed or the onboard supplies 182 of compressed hydrogen are depleted. The cycle of surface charging and submerged operations may be repeated up to the limit of hydrogen available from onboard hydrogen storage tanks 182, without requiring storage tanks of compressed oxygen onboard the AUV 100.

In an embodiment, for example, a marinized, Proton-Exchange Membrane Fuel Cell (PEMFC) 134 may be supplied with high pressure hydrogen gas through a supply line from onboard compressed hydrogen storage bottles 182, and oxygen may be drawn or taken in from atmospheric air accessed at the ocean surface through air snorkel 142. System manager module 160 may be configured to start and stop the PEMFC 134 when the AUV 100 surfaces and submerges respectively. Power generated by operating the PEMFC 134 while the AUV 100 is located on the ocean surface may, simultaneously, charge the chargeable battery subsystem 136 which supplies all power for the AUV 100 when the vehicle is submerged. It may be advantageous that the chargeable battery subsystem 136 may be sized to enable the AUV 100 to perform when submerged for a duration equal or exceeding performance of other AUV's having only batteries. It may be advantageous that such an AUV 100 may be capable of surfacing from submerged operation, re-charging the chargeable battery subsystem 136, and resuming submerged operation, and to repeat this cycle for weeks or months without requiring intervention or recovery to replace or re-charge different batteries.

In an embodiment, it may be advantageous that design of the power generation subsystem 122 and fuel cell 132 may be simplified by omitting storage bottles of pressurized gaseous oxidizing agent, such as oxygen, and related equipment such as associated regulator and flowmeters. Omission of pressurized oxygen storage bottles may enable reduction in size of ballast tanks because of change in mass of the AUV as designed. Omission of pressurized oxygen storage bottles also may enable increase of hull volume or space that may available to be used for increased number and volume of compressed hydrogen storage tanks, thus increasing endurance of the AUV.

In the particular embodiment illustrated in FIG. 1, the AUV 100 may be an Autonomous Underwater/Surface Vehicle (AUSV) that may include the chargeable battery subsystem 136 including a rechargeable battery. The AUV 100 may include a water-tight enclosure 178 within the hull structure 110. The AUV 100 further may include fuel cell charging system 130 including an air-breathing PEMFC 134. Referring to FIG. 1, AUV 100 may include a water-tight fuel cell canister 180 housing the PEMFC 134. AUV 100 may include compressed hydrogen fuel in a plurality of hydrogen storage bottles 182, air intake valve 184, chargeable battery system 136 and system manager module 160.

Referring to FIG. 1, AUV 100 may include an air breathing subsystem 140 configured to intake air from outside, above the ocean surface, and deliver the air to the PEMFC 134. Air breathing subsystem 140 may include air intake snorkel 142 having an air intake port 186 and air intake valve 184.

Referring to FIG. 1, AUV 100 may include water removal system 170 to remove waste water produced from the PEMFC 134. Water removal system 170 may include a waste water collector or sump 188, waste water valve 190 (or "waste water exhaust valve 190") and waste water pump 192. The air intake valve 184 may be coupled to the air intake snorkel 142 including air intake port 186 located proximate an outside surface of the hull structure 110. The air intake snorkel 142 may be configured to transport outside air from outside the AUV 100 above the ocean surface to the air intake port 186, when the AUV 100 is located on the surface and the air intake valve 184 is open.

Referring to FIG. 1, PEMFC 134 may operate by being supplied with hydrogen fuel and an oxidizer which may include intake air taken in by the air breathing subsystem 140 from outside the AUV above the ocean surface. The hydrogen gas may be introduced to the PEMFC 134 from the onboard compressed hydrogen storage bottles 182. The outside air and hydrogen serve as oxidizer and fuel consumed by operation of the PEMFC 134, which produces waste water. Operation of the PEMFC 134 provides electric power output to the chargeable battery subsystem 136, to charge same.

Referring to FIG. 1, waste water generated from fuel cell process operation of the PEMFC 134 may be collected in the waste water collector or sump 188 and discharged by the waste water pump 192 of water removal system 170. The waste water valve 190 may couple the waste water pump 192 of the water removal system 170 to a water discharge port 194 located outside the water-tight enclosure 178. Water removal system 170 routes and transports waste water from the water discharge port 194 to outside of the AUV hull, when the waste water valve 190 is open.

In an embodiment (not shown), the air breathing subsystem 130 may include a wet or dry air filter configured to perform wet or dry air filtering of the intake air passed through the air breathing subsystem 130 to the PEMFC 134. The wet filter may be identical to the wet filter 597 of AUV 500 illustrated in FIG. 5. In an embodiment, waste water generated by the fuel cell 132 may be used in the wet filter media. Such waste water may be circulated by a pump from the fuel cell waste water discharge, to a wet filter configured for wet filtering of outside air to remove salts and other contaminants that may be in solution in the unfiltered, outside air passing through the air breathing subsystem 130. Examples (not shown) of units useable for wet filtering of air may include: an air filter pad having water flowing down the pad, misting air filters, bubbling air filters, and any other suitable unit configured to contact the unfiltered air with a liquid filter media, such as an aqueous filter media. In an embodiment, the filter media water may be replenished or replaced with new waste water generated from operation of the fuel cell, and used filter media water may be discharged overboard from the AUV. The discharged, used filter media water may include particles transferred from air being filtered.

Referring to FIG. 1, the system manager module 160 may be configured to determine that the AUV will submerge, and shut down the PEMFC charging process, close the intake valve, close the waste water valve and switch the power output to the battery system. The system manager module 160 also may be configured to detect when the AUV has surfaced. Upon detecting that the AUV has surfaced, the system manager module 160 may start up the fuel cell charging system 130 including the air-breathing PEMFC 134, open the air intake valve 184, open the waste water exhaust valve 190, switch the power output to the PEMFC 134, and thus begin charging the chargeable battery subsystem 136. The battery management subsystem 126 may control the charge rate and power levels of the chargeable battery subsystem 136. The system manager module 160 may be configured to initiate on-board power generation via fuel cell 132 to recharge the on-board chargeable battery subsystem 136. The system manager module 160 may, if the vehicle is submerged, cause the AUV 100 to undertake ascending to the ocean surface from the submerged position to begin the on-board power generation via fuel cell 132.

Figure 2:
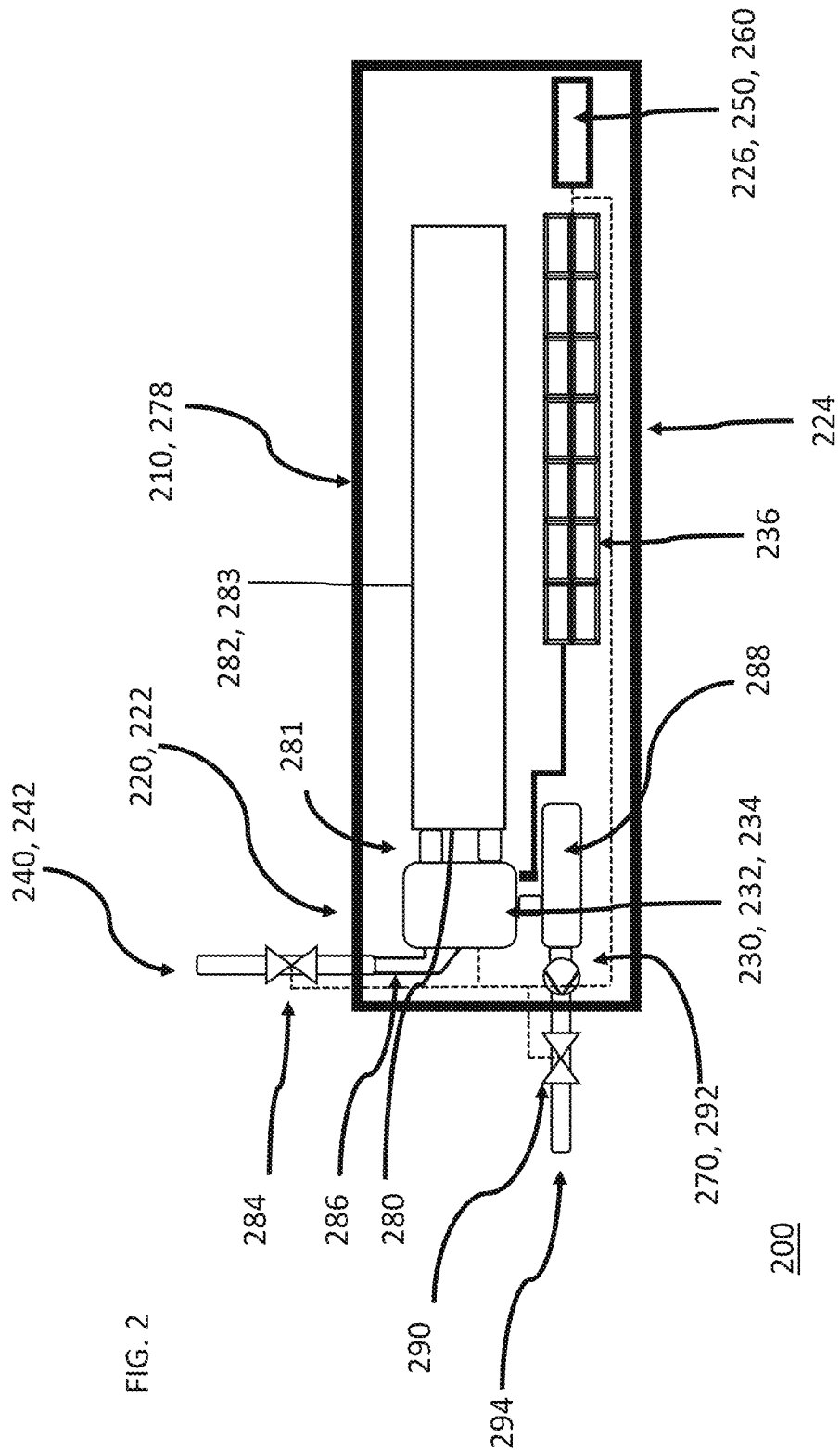
FIG. 2 is a simplified schematic diagram illustrating an autonomous underwater vehicle (AUV) including a fuel cell charging system with air breathing capability, in an embodiment.

Shown in FIG. 2 is AUV 200 in an embodiment. AUV 200 may be identical to AUV 100 shown in FIG. 1, except as otherwise illustrated or described herein. AUV 200 may include a power system 220. Power system 220 may include a power generation subsystem 222 including fuel cell charging system 230. Fuel cell charging system 230 may include an air breathing subsystem 240 having an air intake snorkel 242. Fuel cell charging system 230 may include air breathing PEMFC 234 in communication with the air breathing subsystem 240. The PEMFC 234 may be enclosed in a water-tight enclosure 278 surrounding a fuel cell canister 280. Power generation subsystem 222 may include a plurality of compressed hydrogen storage bottles 282, air intake valve 284, chargeable battery subsystem 236, and a system manager module 260 (FIG. 2). The air breathing subsystem 230 may include an air intake snorkel 240 and air intake valve 284. The water removal system 270 may include waste water collector or sump 288, waste water exhaust valve 290, and waste water pump 292. The air intake valve 284 couples the air intake port 286 to the air intake snorkel 242 on the outside surface of the water-tight submersible enclosure 278. The air breathing subsystem 230 is configured to transport air from the outside surface of the water-tight enclosure 278 to the air intake port 286 when the air intake valve 284 is open, when the UAV 200 is located at the ocean surface. Hydrogen gas, from the connected compressed hydrogen storage bottles 282, is supplied to the PEMFC 234 via hydrogen supply lines 281. The mixture of outside air and hydrogen gas, from the onboard hydrogen storage bottles 282, fuels operation of the PEMFC 234 providing the power output to charge the chargeable battery subsystem 236. The rate and level of charge delivered from the PEMFC 234 to the chargeable battery subsystem 236 is controlled by the battery management subsystem 226.

Referring to FIG. 2, the air intake valve 284, waste water exhaust valve 290, and water removal system 270 including waste water pump 292 are governed by the system manager module 260. Waste water generated from operation of the PEMFC 234 may be collected in waste water collector or sump 288 and discharged from the power system 220 by the waste water pump 292. The waste water exhaust valve 290 may couple the waste water pump 292 to the outside surface of the water-tight enclosure 278, and may be configured to transport waste water from the water discharge port 294 to the outside surface of the water-tight enclosure 278 when the waste water exhaust valve 290 is open.

Referring to FIG. 2, the system manager module 260 may be configured to determine that the hull structure 210 including water-tight enclosure 278 will submerge, control the PEMFC 234 to stop the charging process, close the air intake valve 284, close the waste water exhaust valve 290, and switch the power output to the chargeable battery subsystem 236. The system manager module 260 may also be configured to detect when the hull structure 210 including watertight enclosure 278 has surfaced, control the airbreathing PEMFC 234 to power on and begin operation, open the air intake valve 284, open the waste water exhaust valve 290, switch the power output to the PEMFC 234 and begin the charging the chargeable battery subsystem 236.

Figure 3:
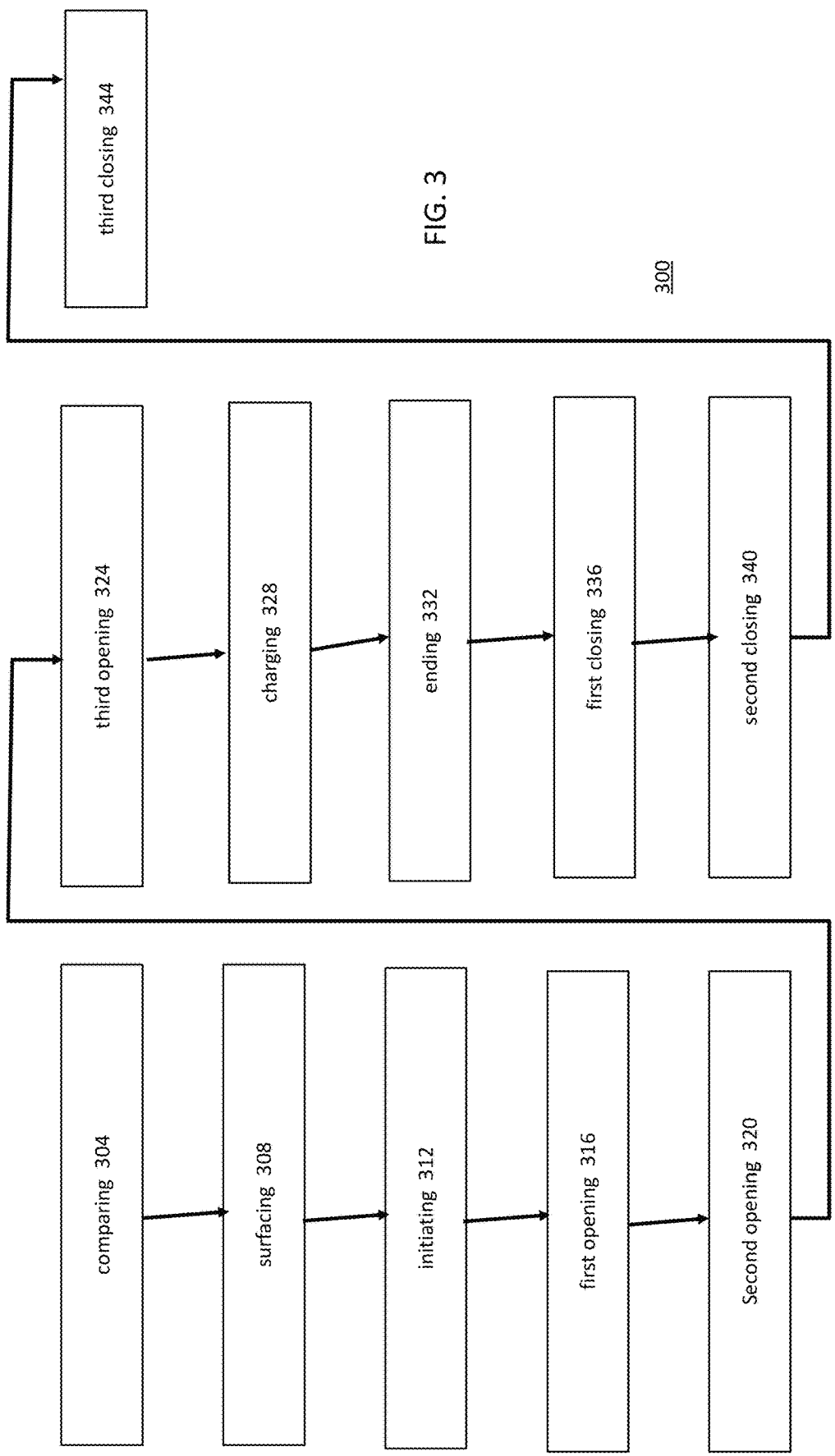
FIG. 3 is a simplified flowchart illustrating a method for use of an autonomous underwater vehicle (AUV) in surface operation, in an embodiment.

FIG. 3 illustrates a method 300 for use of an AUV including a fuel cell charging system having an air breathing subsystem. The AUV, fuel cell charging system and air breathing subsystem may be identical to embodiments as herein disclosed.

As shown in FIG. 3, method 300 may include comparing 304, by a system manager, stored energy level relative to a predetermined minimum threshold, for the chargeable battery subsystem. The system manager may be provided by the onboard data processing system. In an embodiment, the onboard data processing system may include a non-transitory computer-readable medium having processor-executable instructions that, when executed by a data processing device of the data processing system, may cause the data processing device to perform method 300. The system manager may interact with a battery management subsystem to determine stored energy level, control charging, and control discharging of the chargeable battery subsystem. It will be understood that the level of stored energy may be that stored in the power storage subsystem. The predetermined minimum threshold may be a minimum stored energy level that, when met, automatically triggers the system manager module to start a charging cycle for the chargeable battery subsystem.

As shown in FIG. 3, method 300 may include surfacing 308 the AUV at the ocean surface from a submerged location, by a system manager, when the stored energy level has met the predetermined minimum threshold for the chargeable battery subsystem. The stored energy level may be determined relative to the predetermined minimum threshold, by the comparing 304.

As shown in FIG. 3, method 300 may include initiating 312, by a system manager, charging operation by the fuel cell charging system, when the predetermined minimum threshold is met and the AUV is located at the ocean surface by the surfacing 308.

Referring to FIG. 3, method 300 may include first opening 316, by the system manager, the air breathing subsystem, particularly the air intake valve thereof. First opening 316 the air intake valve enables intaking outside air from above the atmosphere above the ocean surface in through the air intake port to pass through air intake snorkel, and passing of the intake air into the air breathing PEMFC in open communication with the air breathing subsystem.

Referring to FIG. 3, method 300 may include second opening 320, by the system manager, the hydrogen supply subsystem including particularly the hydrogen supply valves in communication with hydrogen supply lines thereof. Second opening 320 the hydrogen supply valves enables hydrogen gas to pass from onboard compressed hydrogen storage tanks through the hydrogen supply lines to mix and react with oxygen in the intake air, in the PEMFC. Reaction between the oxygen and hydrogen in the PEMFC generates electric energy which is supplied to the power storage subsystem in electrical communication with the PEMFC, to charge the chargeable battery subsystem.

Referring to FIG. 3, method 300 may include third opening 324, by the system manager, the water removal system including particularly the waste water exhaust valve thereof to enable open communication there through and discharge of waste water from the water removal system by operating the waste water pump thereof.

As shown in FIG. 3, method 300 may include charging 328, by the system manager, the chargeable battery subsystem by controlling operation of the PEMFC to generate electrical energy supplied to the chargeable battery subsystem.

As shown in FIG. 3, method 300 may include ending 332, by the system manager, the charging 328 of the chargeable battery subsystem by controlling electrical energy to discontinue supplying same to the chargeable battery subsystem during operation of the PEMFC.

Referring to FIG. 3, method 300 may include first closing 336, by the system manager, the air breathing subsystem, particularly the air intake valve thereof. First closing 336 the air intake valve disables and discontinues intaking outside air inward through the air intake port and air intake snorkel, and discontinues communication and passing of the intake air into the air breathing PEMFC by closing the air breathing subsystem.

Referring to FIG. 3, method 300 may include second closing 340, by the system manager, the hydrogen supply subsystem including particularly the hydrogen supply valves in communication with hydrogen supply lines thereof. Second closing 340 the hydrogen supply valves prevents hydrogen gas from passing into the PEMFC and thus stops operation of the PEMFC.

Referring to FIG. 3, method 300 may include third closing 344, by the system manager, the water removal system including particularly the waste water exhaust valve thereof to disable open communication therethrough and stop discharge of waste water from the water removal system, and thus to close the water removal system and prevent entry of exterior ocean water into the AUV by backflow through the water removal system.

Figure 4:
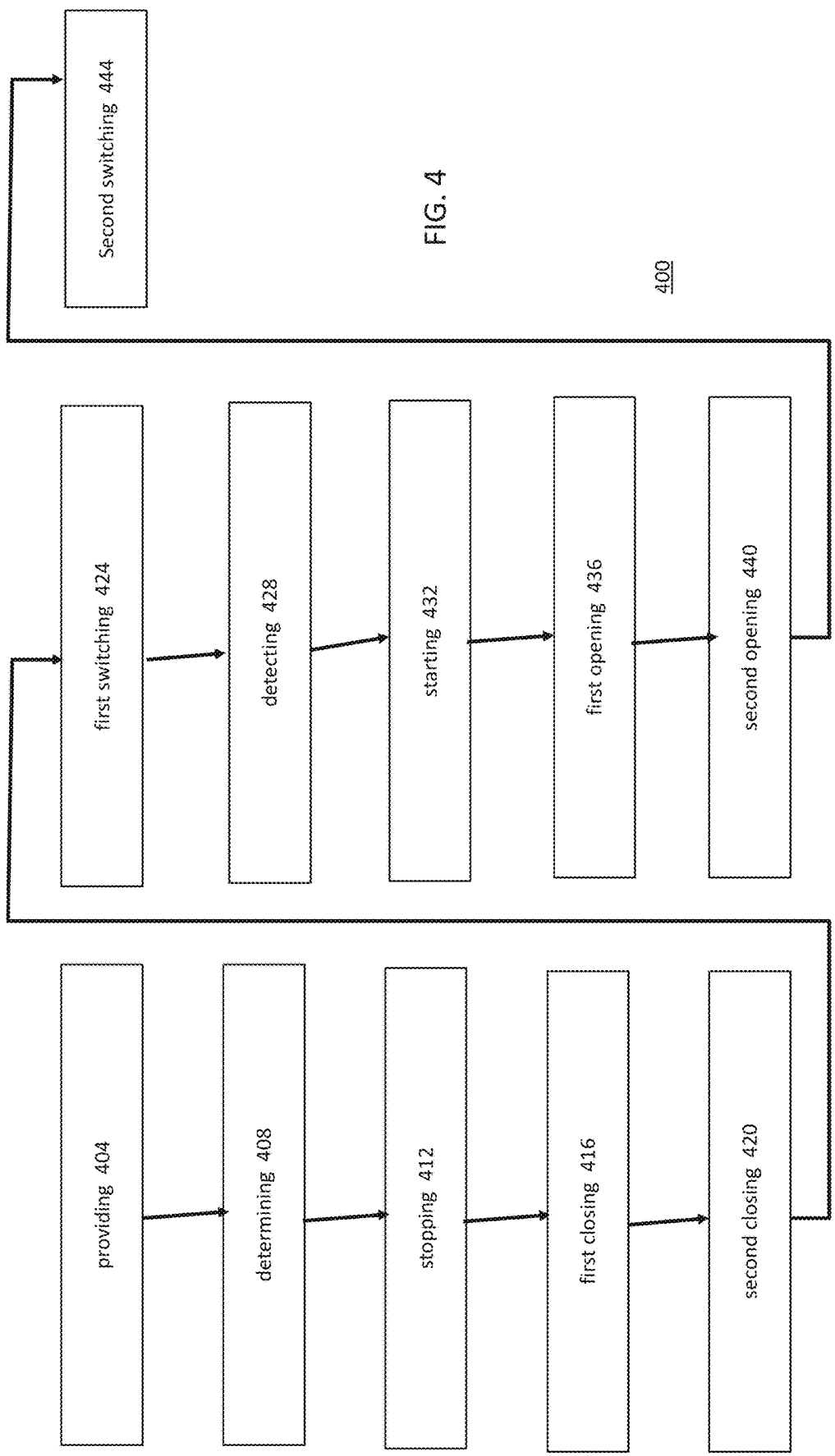
FIG. 4 is a simplified flowchart illustrating a method for use of an autonomous underwater vehicle (AUV) in submerged, undersea operation, in an embodiment.

FIG. 4 illustrates a method 400 for use of an AUV including a fuel cell charging system having an air breathing subsystem. The AUV, fuel cell charging system and air breathing subsystem may be identical to embodiments as herein disclosed. Method 400 may be identical to, or may include steps of, method 300 described hereinabove, to the extent that steps, functions and results may be compatible. As shown in FIG. 4, method 400 may include providing 404, by a data processing system, a system manager configured for use with a fuel cell charging system, according to embodiments disclosed herein, which may include a power generation subsystem having an air breathing subsystem taking in outside air, a supply of compressed hydrogen in onboard storage tanks, where these are supplied to an air-breathing PEMFC housed in a water-tight AUV enclosure or hull structure, which generates waste water and produces electric energy for operating the AUV, a water removal system removing the waste water offboard the AUV. The fuel cell charging system also may include a power storage subsystem including a chargeable battery subsystem and battery management subsystem.

As shown in FIG. 4, method 400 may include determining 408, by the system manager communicatively coupled to the PEMFC, whether the AUV will submerge. The method 400 may further include stopping 412, by the system manager, the PEMFC from charging the chargeable battery subsystem, when the AUV is to submerge. The method 400 may include first closing 416, by the system manager, an air intake valve connected to an air intake snorkel of the air breathing subsystem. The method 400 further may include second closing 420, by the system manager, the water removal system, by closing a waste water exhaust valve connected to a waste water collector or sump of the water removal system. The method 400 also may include first switching 424, by the system manager, the battery management subsystem and chargeable battery subsystem to output mode from charging mode. Method 400 may further include detecting 428, by the system manager, that the AUV has surfaced. The method 400 further may include starting 432, by the system manager, operation of the PEMFC charging system. Method 400 may further include first opening 436, by the system manager module, the intake valve connected to the snorkel. The method 400 further may include second opening 440, by the system manager, the waste water exhaust valve. Method 400 may further include second switching 444, by the system manager, the power output generated by operation of the PEMFC to supply such power output and begin to charge the chargeable battery subsystem.

Figure 5:
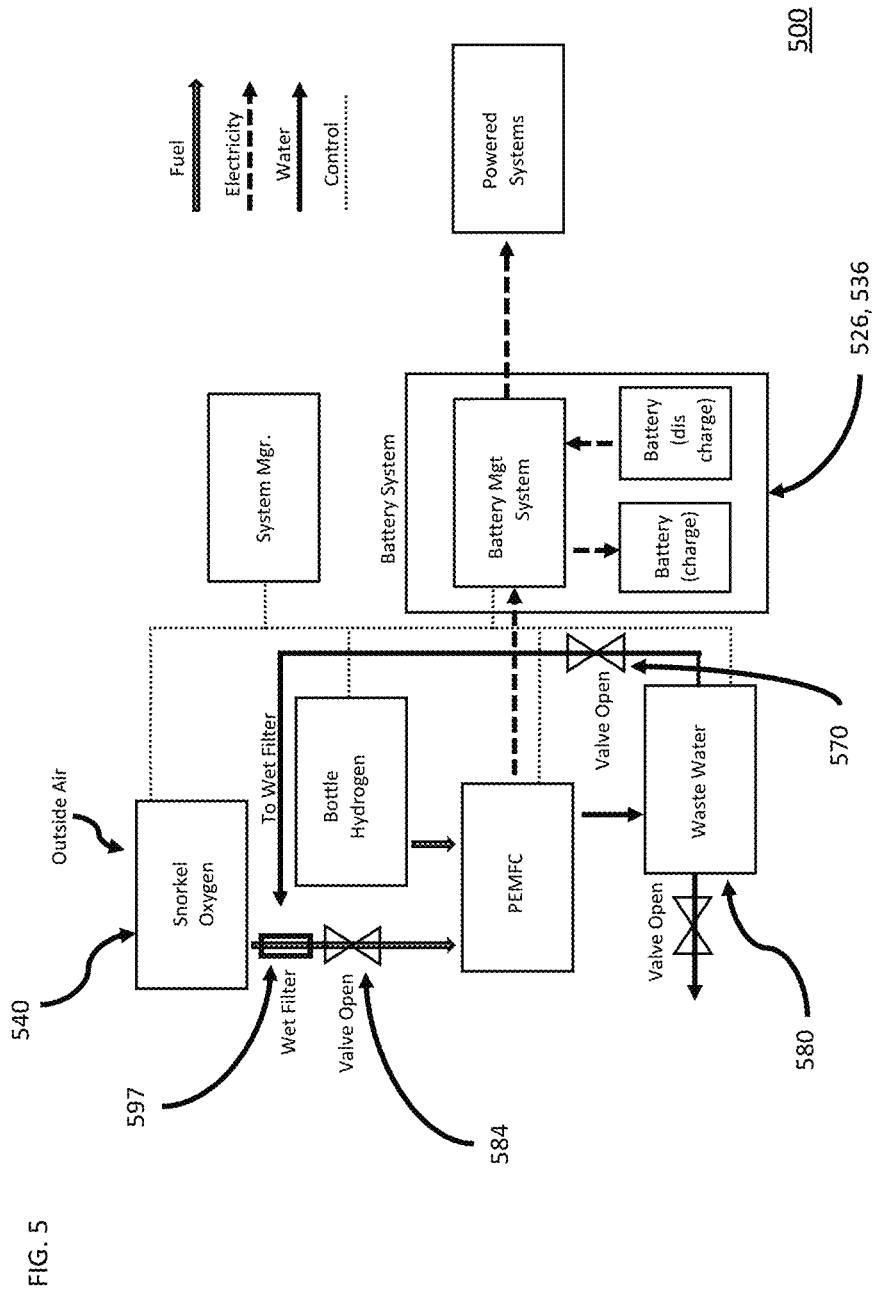
FIG. 5 is a simplified schematic diagram illustrating an autonomous underwater vehicle (AUV) including a fuel cell charging system with air breathing capability, with the chargeable battery subsystem being charged by operation of the fuel cell in surface operation, in an embodiment.

Shown in FIG. 5 is a simplified schematic diagram of an AUV 500 including a fuel cell charging system 530 with air breathing capability, with the chargeable battery subsystem 540 being charged by operation of the fuel cell 532 in surface operation, in an embodiment. AUV 500 may be identical to AUV 100 shown in FIG. 1, or AUV 200 shown in FIG. 2, except as otherwise illustrated or described herein. The air intake valve 584 is shown in open position to enable open communication and the taking in atmospheric air from the exterior to pass intake air in through the air intake snorkel 542 and deliver the intake air to the fuel cell 532. A wet filter 597 is shown. The water removal system 580 is operated to open a delivery valve 570 and direct waste water to the wet filter 597. The water removal system 580 is also operated to discharge waste water outside the watertight hull structure 510. The battery management subsystem 526 allows charging of the chargeable battery subsystem 536 by operation of the fuel cell charging system 530.

Figure 6:
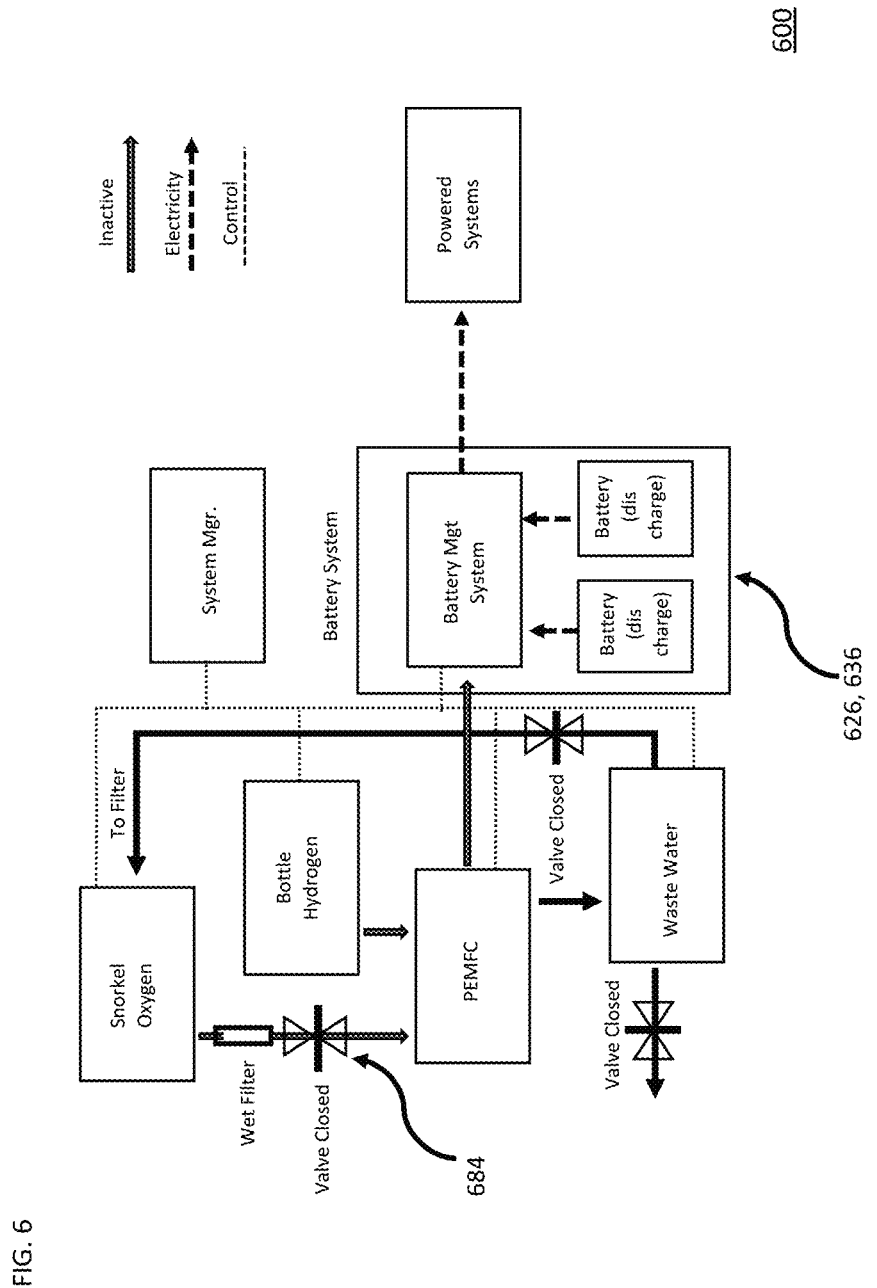
FIG. 6 is a simplified schematic diagram illustrating an autonomous underwater vehicle (AUV) including a fuel cell charging system with air breathing capability, with the chargeable battery subsystem discharging to power operation of the AUV in submerged operation, in an embodiment.

FIG. 6 is a simplified schematic diagram illustrating an AUV 600 including a fuel cell charging system 630 with air breathing capability, with the chargeable battery subsystem 640 discharging to power operation of the AUV 600 in submerged operation, in an embodiment. AUV 600 may be identical to AUV 100 shown in FIG. 1, AUV 200 shown in FIG. 2, or AUV 500 shown in FIG. 5, except as otherwise illustrated or described herein. The air intake valve 684 is shown in closed position to close the air breathing subsystem 640. The battery management subsystem 626 and chargeable battery subsystem 636 are operated to discharge the chargeable battery subsystem 636 power to the powered systems while submerged.

Apparatus, methods and systems according to embodiments of the disclosure are described. Although specific embodiments are illustrated and described herein, it may be appreciated by those of ordinary skill in the art that any arrangement which is calculated to achieve the same purposes maybe substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art may appreciate that implementations maybe made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art may readily appreciate that the names of the methods and apparatus are not intended to limit embodiments or the disclosure. Furthermore, additional methods, steps, and apparatus maybe added to the components, functions maybe rearranged among the components, and new components to correspond to future enhancements and physical devices used in embodiments may be introduced without departing from the scope of embodiments and the disclosure. One of skill in the art may readily recognize that embodiments are applicable to future systems, future apparatus, future methods, and different materials. All methods described herein may be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. An autonomous underwater vehicle (AUV) 100, comprising:
   an onboard computing system 150 comprising a processor, the computing system 150 comprising instructions executable by the processor to provide a system manager module 160;
   a power system 120 configured to provide electric power to operating units of the AUV;
   the power system 120 comprising a power generation subsystem 122 in electrical communication with a power storage subsystem 124, the power system 120 configured to operate in a charging cycle;
   the power generation subsystem 122 comprising a fuel cell charging system 130, the fuel cell charging system 130 comprising an air breathing subsystem 140 changeable between an open condition and closed condition, in the open condition the air breathing subsystem 140 in open communication with atmospheric air when the AUV 100 is located at the ocean surface, the air breathing subsystem 140 comprising intake air passed into the AUV 100 from the external atmosphere, in the closed condition the air breathing subsystem 140 closed to prevent intake air from passing into the AUV 100 from the external atmosphere;
   the fuel cell charging system 130 comprising an onboard supply of hydrogen gas 182 delivered to a fuel cell 132;
   the fuel cell 132 receiving the intake air, the fuel cell 132 receiving the hydrogen gas, the fuel cell 132 configured to perform fuel cell process operation with the oxygen in the intake air and with the hydrogen gas, the fuel cell process operation generating electric energy and waste water output from the fuel cell 132;
   the power storage subsystem 124 comprising a chargeable battery subsystem 136 configured to store electric energy output from the fuel cell 132; and
   the system manager module 160 configured to control the AUV 100 to ascend to the surface from submerged operation to perform a charging period of the charging cycle, the system manager module 160 configured to control the AUV 100 to descend from the surface to submerged operation to perform a discharging period to power operations of the AUV 100,
   the water removal system 170 comprising a water pump 192 in communication with the waste water collector 188 to pump collected waste water to be discharged outside the hull structure 110,
   the water removal system 170 selectively operable to provide waste water to a wet filter 597 in communication with the air breathing subsystem 140, the waste water serving as a filter media of the wet filter 597.

2. An autonomous underwater vehicle (AUV) 100 according to claim 1, comprising:
   a hull structure 110 omitting a storage tank of gaseous oxidizing agent.

3. An autonomous underwater vehicle (AUV) 100 according to claim 1, comprising:
   the water removal system 170 comprising a water pump 192 in communication with the waste water collector 188 to pump collected waste water to be discharged outside the hull structure 110.

4. An autonomous underwater vehicle (AUV) 100 according to claim 1, comprising:
   the water removal system 170 comprising a waste water exhaust valve 190 operable between open position and closed position, the waste water exhaust valve 190 in the open position enabling open communication for the waste water to pass outward to be discharged outside the hull structure 110.

5. An autonomous underwater vehicle (AUV) 100 according to claim 1, comprising:
   the power storage subsystem 125 comprising a chargeable battery subsystem 136;
   a battery management subsystem 126 configured to control charging and discharging of the chargeable battery subsystem 136.

6. An autonomous underwater vehicle (AUV) 100 according to claim 1, comprising:
   a ballast system 116 comprising a ballast volume independent of oxygen storage.

7. An autonomous underwater vehicle (AUV) 100 according to claim claim 1, comprising:
   the hull structure 110 having a form factor independent of onboard oxygen storage volume.

8. An autonomous underwater vehicle (AUV) 100 according to claim 1, comprising:
   hydrogen storage 182 volume independent of oxygen storage.

9. An autonomous underwater vehicle (AUV) 100, comprising:
   an onboard computing system 150 comprising a processor, the computing system 150 comprising instructions executable by the processor to provide a system manager module 160;
   a power system 120 configured to provide electric power to operating units of the AUV;
   the power system 120 comprising a power generation subsystem 122 in electrical communication with a power storage subsystem 124, the power system 120 configured to operate in a charging cycle;
   the power generation subsystem 122 comprising a fuel cell charging system 130, the fuel cell charging system 130 comprising an air breathing subsystem 140 changeable between an open condition and closed condition, in the open condition the air breathing subsystem 140 in open communication with atmospheric air when the AUV 100 is located at the ocean surface, the air breathing subsystem 140 comprising intake air passed into the AUV 100 from the external atmosphere, in the closed condition the air breathing subsystem 140 closed to prevent intake air from passing into the AUV 100 from the external atmosphere;
   the fuel cell charging system 130 comprising an onboard supply of hydrogen gas 182 delivered to a fuel cell 132;
   the fuel cell 132 receiving the intake air, the fuel cell 132 receiving the hydrogen gas, the fuel cell 132 configured to perform fuel cell process operation with the oxygen in the intake air and with the hydrogen gas, the fuel cell process operation generating electric energy and waste water output from the fuel cell 132;

the power storage subsystem 124 comprising a chargeable battery subsystem 136 configured to store electric energy output from the fuel cell 132; and the system manager module 160 configured to control the AUV 100 to ascend to the surface from submerged operation to perform a charging period of the charging cycle, the system manager module 160 configured to control the AUV 100 to descend from the surface to submerged operation to perform a discharging period to power operations of the AUV 100, hydrogen storage 182 volume independent of oxygen storage.

10. An autonomous underwater vehicle (AUV) 100 according to claim 9, comprising:

a hull structure 110 omitting a storage tank of gaseous oxidizing agent.

11. An autonomous underwater vehicle (AUV) 100 according to claim 9, comprising:

a water removal system 170 comprising a waste water collector 188 configured to receive waste water generated by operation of the fuel cell 132.

12. An autonomous underwater vehicle (AUV) 100 according to claim 11, comprising:

the water removal system 170 comprising a water pump 192 in communication with the waste water collector 188 to pump collected waste water to be discharged outside the hull structure 110.

13. An autonomous underwater vehicle (AUV) 100 according to claim 11, comprising:

the water removal system 170 comprising a waste water exhaust valve 190 operable between open position and closed position, the waste water exhaust valve 190 in the open position enabling open communication for the waste water to pass outward to be discharged outside the hull structure 110.

14. An autonomous underwater vehicle (AUV) 100 according to claim 11, comprising:

the water removal system 170 selectively operable to provide waste water to a wet filter 597 in communication with the air breathing subsystem 140, the waste water serving as a filter media of the wet filter 597.

15. An autonomous underwater vehicle (AUV) 100 according to claim 9, comprising:

the power storage subsystem 125 comprising a chargeable battery subsystem 136;

a battery management subsystem 126 configured to control charging and discharging of the chargeable battery subsystem 136.

16. An autonomous underwater vehicle (AUV) 100 according to claim 9, comprising:

a ballast system 116 comprising a ballast volume independent of oxygen storage.

17. An autonomous underwater vehicle (AUV) 100 according to claim 9, comprising:

the hull structure 110 having a form factor independent of onboard oxygen storage volume.

18. A method 400 of use of an autonomous underwater vehicle (AUV) including a fuel cell charging system having an air breathing subsystem taking intake air from the external atmosphere, a supply of compressed hydrogen in onboard storage tanks, the intake air and hydrogen supplied to an air-breathing PEMFC housed in a water-tight AUV hull structure, the PEMFC operable to produce electric energy for operating the AUV, the PEMFC generating waste water, the power generation subsystem comprising a water removal system for discharging the waste water offboard, the fuel cell charging system having a power storage subsystem including a chargeable battery subsystem in communication with a battery management subsystem, said method 400 comprising:

providing 404, by an onboard computing system, a system manager configured for controlling the fuel cell charging system;

determining 408, by the system manager, when the AUV will submerge;

stopping 412, by the system manager, the PEMFC from charging the chargeable battery subsystem, when the AUV is to submerge;

first closing 416, by the system manager, an air intake valve connected to an air intake snorkel of the air breathing subsystem;

second closing 420, by the system manager, the water removal system;

first switching 424, by the system manager, the battery management subsystem and chargeable battery subsystem to output mode from charging mode;

detecting 428, by the system manager, that the AUV has surfaced;

starting 432, by the system manager module, operation of the PEMFC charging system;

first opening 436, by the system manager, the intake valve connected to the snorkel;

second opening 440, by the system manager, the waste water exhaust valve; and second switching 444, by the system manager, power output generated by operation of the PEMFC to charging the chargeable battery subsystem.

19. A non-transitory computer-readable medium having tangibly embodied thereon and accessible therefrom processor-executable instructions that, when executed by at least one data processing device of a data processing system, causes said at least one data processing device to perform the method 400 of claim 18.

20. A method 300 of use of an autonomous underwater vehicle (AUV) including a fuel cell charging system, the fuel cell charging system including a power generation subsystem having an air breathing subsystem taking intake air from the external atmosphere, a supply of compressed hydrogen in onboard storage tanks, an air-breathing PEMFC housed in a water-tight AUV hull structure, the PEMFC receiving the intake air and hydrogen, the PEMFC operable to produce electric energy for operating the AUV, the PEMFC generating waste water, the power generation subsystem comprising a water removal system for discharging the waste water offboard, the fuel cell charging system having a power storage subsystem including a chargeable battery subsystem in electric current communication with the power generation subsystem to receive electric energy to charge the chargeable battery subsystem, the chargeable battery subsystem in communication with a battery management subsystem operable to control charging and discharging of the chargeable battery subsystem, said method 300 comprising:

operating, by an onboard computing system comprising a processor, a system manager configured for controlling the fuel cell charging system;

comparing 304, by the system manager, stored energy level relative to a predetermined minimum threshold, for the chargeable battery subsystem;

surfacing 308 the AUV to the ocean surface from a submerged location, by the system manager, when the stored energy level has met the predetermined minimum threshold for the chargeable battery subsystem;

initiating 312, by the system manager, charging operation by the fuel cell charging system when the predetermined minimum threshold is met when the AUV is located at the ocean surface;

first opening 316, by the system manager, the air breathing subsystem by opening an air intake valve thereof to intake atmospheric air to pass as intake air into the air breathing PEMFC;

second opening 320, by the system manager, the hydrogen supply subsystem by opening a hydrogen supply valve to enable hydrogen gas to pass into and react in the PEMFC to generate electric energy supplied to the power storage subsystem in electrical communication with the PEMFC, to charge the chargeable battery subsystem;

third opening 324, by the system manager, the water removal system by opening a waste water exhaust valve to enable discharge of waste water from the water removal system;

charging 328, by the system manager, the chargeable battery subsystem by controlling operation of the PEMFC to generate electrical energy supplied to the chargeable battery subsystem;

ending 332, by the system manager, charging of the chargeable battery subsystem by disrupting supply of electric energy to the chargeable battery subsystem;

first closing 336, by the system manager, the air breathing subsystem by closing an air intake valve, to discontinue intaking and passing of intake air into the air breathing PEMFC;

second closing 340, by the system manager, the hydrogen supply subsystem by closing a hydrogen supply valve to prevent hydrogen gas from passing into the PEMFC, to stop operation of the PEMFC; and third closing 344, by the system manager, the water removal system by closing the waste water exhaust valve to stop discharge of waste water from the water removal system and prevent backflow entry of foreign water inside the AUV hull structure.

21. A non-transitory computer-readable medium having tangibly embodied thereon and accessible therefrom processor-executable instructions that, when executed by at least one data processing device of a data processing system, causes said at least one data processing device to perform the method 300 of claim 20.

* * * * *